United States Patent [19] [11] Patent Number: 5,069,892
Nakai [45] Date of Patent: Dec. 3, 1991

[54] CARBON BLACK FOR TIRE TREAD

[75] Inventor: Kiyonari Nakai, Aichi, Japan

[73] Assignee: Tokai Carbon Co., Ltd., Tokyo, Japan

[21] Appl. No.: 604,396

[22] Filed: Oct. 26, 1990

Related U.S. Application Data

[63] Continuation of Ser. No. 282,763, Dec. 12, 1988, abandoned.

[30] Foreign Application Priority Data

Feb. 5, 1988 [JP] Japan .................................. 63-23776

[51] Int. Cl.$^5$ ............................................ C01B 31/02
[52] U.S. Cl. .................... 423/445; 423/449; 423/456; 423/458
[58] Field of Search ............... 423/445, 449, 456, 458; 422/151

[56] References Cited

U.S. PATENT DOCUMENTS

| | | | |
|---|---|---|---|
| 2,632,713 | 3/1953 | Krejci | 423/458 |
| 2,971,822 | 2/1961 | Williams | 422/151 |
| 3,376,111 | 4/1968 | Stegelman | 423/458 |
| 3,523,812 | 8/1970 | Kraus | 423/449 |
| 3,615,211 | 11/1971 | Lewis | 422/151 |
| 3,988,478 | 10/1976 | Wiggins | 423/445 |
| 4,367,208 | 1/1983 | Glasstetter et al. | 423/449 |
| 4,478,973 | 10/1984 | Misono et al. | 524/496 |
| 4,486,398 | 12/1984 | Casperson | 423/456 |
| 4,500,672 | 2/1985 | Suzuki | 423/445 |
| 4,786,677 | 11/1988 | Nakai | 524/496 |
| 4,808,395 | 2/1989 | Yoshimura et al. | 423/456 |

FOREIGN PATENT DOCUMENTS 61-277446 12/1987 Japan .................................. 423/445

*Primary Examiner*—Robert Kunemund
*Attorney, Agent, or Firm*—Armstrong, Nikaido, Marmelstein, Kubovcik & Murray

[57] ABSTRACT

The present invention discloses a carbon black having an $N_2SA$ of 75 to 105 m$^2$/g and a compressive DBP absorption of at least 110 ml/100 g and, at the same time, having the following selective characteristic values:

true specific gravity $\leq 1.9080 - 0.0016 \times N_2SA$;
void diameter of particle aggregates (nm) $\geq 62.2 - 0.236 \times N_2SA$; and
range of aggregate size distribution [$\Delta$Dst (nm)] $\geq 30.6 + 0.6118 \times \overline{D}$st.

2 Claims, 1 Drawing Sheet

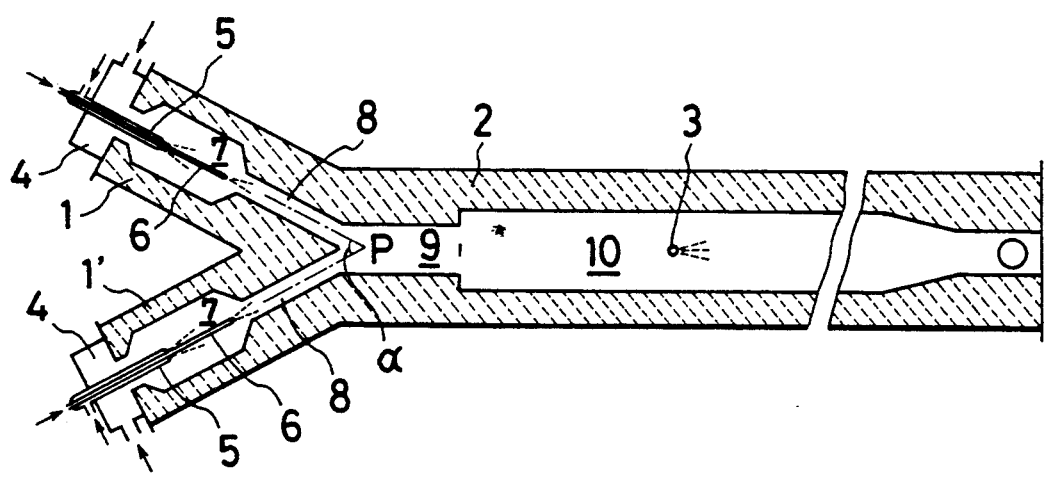

CARBON BLACK FOR TIRE TREAD

This application is a continuation of application Ser. No. 282,763 filed Dec. 12, 1988, now abandoned.

BACKGROUND OF THE INVENTION

The present invention relates to carbon black for tire tread and more particularly to novel carbon black suitable for use as a reinforcement of rubber, such as tire tread of a passenger car, where high abrasion resistance and resilience are required. There are many kinds of carbon black for reinforcement of rubber having different characteristics. The characteristics of carbon black are a major factor determining various properties of a rubber composition with which the carbon black is compounded.

For this reason, in compounding carbon black with a rubber composition, carbon black having characteristics suitable for applications of the rubber composition has been selected and used.

In recent years, in order to improve the fuel saving of automobiles, the development of a rubber composition which exhibits high abrasion resistance and excellent resilience when used as a tire tread has eagerly been desired.

In general, hard-grade carbon black having a small particle diameter and a large specific surface area has been used for rubber, such as tire tread, where it should exhibit high abrasion resistance under severe conditions.

On the other hand, in order to attain fuel saving through a decrease in the rolling resistance of the tire tread portion, it is necessary to increase the resilience of rubber by making use of carbon black having a large particle diameter and a small specific surface area or carbon black having a wide range of aggregate size distribution per given particle diameter.

Thus it was difficult to impart both of the high abrasion resistance and the high resilience to rubber at the same time, because these requirements are contradictory with each other from the viewpoint of the capability of carbon black in reinforcing rubber.

For this reason, various proposals have been made to impart both of the abrasion resistance and resilience to rubber through the compounding of the rubber with carbon black having particular properties, such as a particular specific surface area measured by the nitrogen adsorption method (hereinafter abbreviated to "$N_2SA$") and dibutyl phthalate (hereinafter abbreviated to "DBP") absorption, selected by evaluating various characteristics of carbon black in more detail on a microstructure level besides fundamental characteristics such as the particle diameter, specific surface area and structure of carbon black.

For example, a proposal has been made on carbon black belonging to hard carbon black having an $N_2SA$ of at least 60 $m^2/g$ and a DBP of at least 108 ml/100 g and satisfying the following characteristics requirements:

true specific gravity $\leq 1.8379 - 0.0006 \times N_2SA$;

tinting strength (%) $\geq 0.6979 \times N_2SA - 0.4278 \times DBP + 203.3$; and range of aggregate size distribution (hereinafter abbreviated to "$\Delta Dst$") $\geq 30.6 + 0.6118 \times \overline{Dst}$ (see U.S. Pat. No. 4,478,973 issued Oct. 23, 1984.

According to this proposal, for example, the true specific gravity of a conventional carbon black is 1.7854 when the $N_2SA$ is 93 $m^2/g$, while the true specific gravity of the proposed carbon black is as low as 1.7541 when the $N_2SA$ is substantially the same as that of the conventional carbon black, i.e., 92 $m^2/g$.

Further, as is apparent from the above-described formulae, the proposed carbon black has the tinting strength and the range of aggregate size distribution each maintained above a given value.

On the other hand, Japanese Patent Application No. 62-154474 proposes a rubber composition having a high abrasion resistance imparted thereto by making use of carbon black having an $N_2SA$ of at least 140 $m^2/g$ and a relatively enlarged void size per given specific surface area of particle aggregates to improve the dispersion of the carbon black in the rubber component.

Despite the above-described proposals, the development of a rubber composition which has higher resilience while maintaining high abrasion resistance is still eagerly desired in the art.

Under the above-described circumstances, the present inventors have found that it is possible to effectively impart both of the above-described contradictory characteristics to rubber without the necessity of maintaining the tinting strength above a given value through setting of the true specific gravity per given specific surface area at a smaller value and the intra-aggregate pore diameter at a larger value with an $N_2SA$ of 75 to 105 $m^2/g$, which has led to the completion of the present invention.

When the $N_2SA$ is 75 to 105 $m^2/g$ according to the present invention, the dispersion is better than that of the carbon black having an $N_2SA$ of at least 140 mg/g described in the above-described Japanese Patent Application No. 62-154474. Accordingly, in the present invention, a definite preponderance of the abrasion resistance has been established by further increasing the void diameter of the particle aggregates per given $N_2SA$.

SUMMARY OF THE INVENTION

An object of the present invention is to provide carbon black which can impart not only high abrasion resistance but also high resilience to a rubber composition.

A second object of the present invention is to provide carbon black for tire tread.

The above-described objects of the present invention can be attained by carbon black having an $N_2SA$ of 75 to 105 $m^2/g$ and a compressive DBP absorption of at least 110 ml/100 g and, at the same time, having the following characteristic values:

true specific gravity $\leq 1.9080 - 0.0016 \, [N_2SA]$;

void diameter of particle aggregates (nm) $\geq 62.2 - 0.236 \, [N_2SA]$; and range of aggregate size distribution $\Delta Dst \geq 30.6 + 0.6118 \, [\Delta st]$.

BRIEF DESCRIPTION OF THE DRAWINGS

The accompanying single drawing figure shows a longitudinal sectional view of a furnace for producing the furnace carbon black of this invention.

DESCRIPTION OF THE PREFERRED EMBODIMENTS

The carbon black for tire tread of the present invention has an $N_2SA$ of 75 to 105 $m^2/g$ and a compressive DBP absorption of at least 110 ml/100 g.

The above-described carbon black belongs to hard carbon black usually employed for tire tread.

When the $N_2SA$ is less than 75 $m^2/g$, no high abrasion resistance can be maintained, while when the $N_2SA$ exceeds 105 $m^2/g$, the resilience is remarkably lowered. When the compressive DBP absorption is less than 110 ml/100 g, as with the above-described case, no high abrasion resistance can be maintained and the resilience is lowered.

The carbon black of the present invention has the following characteristics besides the above-described ones:

true specific gravity $\leq 1.9080 - 0.0016 \times N_2SA$;

void diameter of particle aggregates (nm) $\geq 62.2 - 0.236 \times N_2SA$; and range of aggregate size distribution $\Delta Dst$ (nm) $\geq 30.6 + 0.6118 \times \Delta st$.

When the true specific gravity exceeds $1.9080 - 0.0016 \times N_2SA$, not only high abrasion resistance cannot be attained but also the resilience is lowered. When the void diameter of particle aggregates is less than $62.2 - 0.236 \times N_2SA$, the dispersion of the carbon black in the rubber component is lowered, which makes it impossible to attain high abrasion resistance.

Further, when $\Delta Dst$ is less than $30.6 + 0.6118 \times \Delta st$, it becomes difficult to impart high resilience.

As described above, a decrease in the true specific gravity and an increase in the $\Delta Dst$ are factors which contribute to an improvement in the resilience while maintaining the abrasion resistance.

Further, the void diameter of the particle aggregates is a measure of the anisotropy of the aggregate structure of the carbon black. When the void diameter of the particle aggregates per given range of specific surface area is large, there occurs a strong interaction between the carbon black and the rubber component during the step of compounding with the rubber component.

Thus, in the present invention, it became possible to impart high resilience while maintaining the abrasion resistance through a decrease in the true specific gravity and an increase in the $\Delta Dst$ and, at the same time, an increase in the void diameter of the particle aggregates.

The carbon black having the above-mentioned characteristic properties is produced by a Y-shaped oil-furnace process using a reactor as shown in the accompanying figure, in which reference numerals 1 and 1' each denote a generator comprising a wind box 4, a burner 5, a feedstock oil spray nozzle 6, a combustion chamber 7, and a pyrolysis duct 8. The generators are arranged in such a manner that the pyrolysis ducts converge at point P in the cylindrical main reaction zone 2. The hydrocarbon feedstock oil is sprayed into the combustion gas of fuel oil so that the oil spray is pyrolyzed. The burned gas streams from the generators enter the zone 2 at a high speed and impinge against each other.

In operation, adequate adjustments are made for the supply of feedstock oil and other conditions for pyrolysis in the generators and for the position of water spray 3 in the main reaction zone 2 which determines the residence time for the burned gas to reach the water spray, whereby it is possible to produce the carbon black that has all the characteristic properties specified in this invention.

The carbon black of the present invention is compounded with natural rubber or various synthetic rubbers such as styrene-butadiene rubber, polybutadiene rubber, isoprene rubber, and butyl rubber. The carbon black is compounded in an amount of 25 to 250 parts by weight, preferably 40 to 80 parts by weight based on 100 parts by weight of the rubber component and kneaded together with necessary components such as commonly employed vulcanizer, vulcanization accelerator, antioxidant, vulcanization assistant, softening agent, and plasticizer. The resultant compound is vulcanized and then formed into a tire tread. As described above, the carbon black of the present invention is remarkably low in the true specific gravity value per $N_2SA$ and remarkably high in the void diameter of the particle aggregates. Further, the carbon black of the present invention has a unique physico-chemical property in that the $\Delta Dst$ is broad.

Since the carbon black of the present invention has all of these characteristics, the compounding thereof with rubber enables a remarkable improvement in the resilience of the rubber while maintaining the abrasion resistance.

The method of determining the above-described various characteristics of the carbon black according to the present invention will now be described.

(1) Nitrogen adsorption specific surface area ($N_2SA$) was determined by ASTM D3037-78 "Standard Methods of Testing Carbon black—Surface Area by Nitrogen Adsorption", Method B. The nitrogen adsorption specific surface area ($N_2SA$) of Industry Reference Blacks (IRB)#5 found by this method is 80.3 $m^2/g$ (2) DBP absorption number of compressed sample was determined by ASTM D3439-79 "Carbon Black-Dibutyl Phthalate Absorption Number of Compressed Sample".

(3) True specific gravity:

A carbon black sample is placed in a crucible with a drop lid and devolatilized at $650 \pm 25°$ C. for 5 min.

A proper amount of carbon black is weighed into a pycnometer. After being wetted with a small quantity of benzene, the carbon black is deaerated under a vacuum of 2 to 5 mmHg until bubbling does not occur any longer. The pycnometer is filled with benzene and held in a high temperature water bath at $25 \pm 0.1°$ C. for 30 min. The mass of the pycnometer containing benzene and carbon black is measured.

The true specific gravity of carbon black is calculated from the following equation:

$$\text{True specific gravity} = \frac{(D - A)}{(D - A) - (E - C)} \times d_4^{25}$$

where

A is the mass of the pycnometer,

C is the mass of the pycnometer plus benzene,

D is the mass of the pycnometer plus carbon black sample,

E is the mass of the pycnometer plus carbon black sample plus benzene, and $d_4^{25}$ is the specific gravity of benzene.

The true specific gravity of IRB No. 5 measured according to this method was 1.7781.

(4) Void diameter of particle aggregates:

A mercury porosimeter (Pore Sizer 9300) manufactured by Micromeritics is used for this purpose, and a cell for exclusive use (3 ml) is charged with 0.2 g of a carbon black pellet of which the particle size has been adjusted to 250 to 500 μm. Mercury is introduced into the cell under a pressure of 25 to 2,000 $lb/in^2$ to determine a pressure at which the amount of mercury introduced under pressure is rapidly increased. The pore diameter is calculated from the pressure and regarded as the void diameter of the particle aggregates.

The void diameter of the particle aggregates of IRB No. 5 ($N_2SA$: 80.3 $m^2/g$) was measured by the above-described method and found to be 40 nm.

(5) Range of aggregates size distribution ($\overline{D}st$, $\Delta Dst$)

A carbon black sample is dried according to JIS K6221 (1975), Section 6.2.1, Method A. The dried carbon black sample is accurately weighed out and dispersed into a 20% aqueous solution of ethanol containing a small quantity of surface active agent (dispersing agent) to prepare a dispersion of carbon black in a concentration of 50 mg/l. Complete dispersion is accomplished ultrasonically.

Then the dispersion is subjected to centrifugal classification by a disk centrifuge (made by Joyes Loebl Co., England) set to 8000 rpm. 10 to 20 ml of spin liquid (2% aqueous solution of glycerin) is added and then 1 ml of buffer (aqueous solution of ethanol) is added. Finally, 0.5 to 1.0 ml of the dispersion of carbon black is added by means of a syringe. Centrifugation is started. Simultaneously, the recorder is also started to draw a distribution curve of aggregate Stokes diameter. The Stokes diameter of the maximum frequency in the distribution curve thus prepared is defined as $\overline{D}st$ (m$\mu$), and the difference between two Stokes diameters each obtained in a frequency of 50% of the maximum frequency is defined as $\Delta Dst$ (m$\mu$). The $\overline{D}st$ and $\Delta Dst$ of ASTM D-24 Standard Reference Black C-3 (N234) measured by the above-described method are 80 nm and 60 nm, respectively.

The present invention will now be described in more detail with reference to the following Examples.

EXAMPLE 1

As shown in the drawing, there was provided an oil furnace having a Y-shaped structure comprising a main reaction zone 2 composed of two connectively provided portions, i.e., a large-diameter rear portion 10 having an inner diameter of 300 mm and a length of 4000 nm and a small-diameter front portion 9 having an inner diameter of 135 mm and a length of 850 mm; and, convergently linked to the front thereof at a crossing angle ($\alpha$) of 60°, two generators, i.e., a first generator 1 equipped with a combustion chamber 7 having an inner diameter of 400 mm and a length of 800 mm (including a conical portion having a length of 200 mm) provided with a burner 5 and a feedstock oil spray nozzle 6 through a wind box 4 and a pyrolysis duct 8 having an inner diameter of 80 mm and a length of 700 mm and a second generator 1' equipped with a combustion chamber 7 having an inner diameter of 650 mm and a length of 800 mm (including a conical portion having a length of 200 mm) similarly provided a stockoil spray nozzle 6 and a pyrolysis duct 8 having an inner diameter of 110 mm and a length of 1000 mm. An aromatic hydrocarbon oil having a specific gravity of 1.0703 (15/4° C.), a viscosity of 2.10 (Engler; 40/20° C.), a benzene insoluble of 0.03%, a coefficient of correlation (BMCI) of 140, and an initial boiling point of 103° C. was used as a stockoil, and a hydrocarbon oil having a specific gravity of 0.903 (15.4° C.), a viscosity (CST; 50° C.) of 16.1, a residual carbon content of 5.4%, a sulfur content of 1.8%, and a flash point of 96° C. was used as a fuel oil.

The carbon black of the present invention was prepared by making use of the above-described reaction furnace, stockoil, and fuel oil under generation conditions shown in Table 1.

Various characteristics and calculated values of the carbon black thus prepared are shown in Table 2.

In Table 1, Run Nos. 1 to 4 (examples of the present invention) are each carbon black prepared by properly controlling the conditions of each generator and, at the same time, cooling a formed carbon black gas steam at two stages, while Comparative Example No. 5 is carbon black prepared by conducting one-stage cooling. In Table 2, Run Nos. 6 to 8 shown as comparative examples are each carbon black having a specific surface area measured by the nitrogen adsorption method ($N_2SA$) and a compressive DBP absorption equal to those of the carbon black prepared by the conventional process.

TABLE 1

| Run No. | generator | total air feed rate (Nm³/hr) | fuel oil feed rate (kg/hr) | fuel combustion rate (%) | feed rate of stockoil (kg/hr) | position of 1st cooling (mm) | position of 2nd cooling (mm) | 1st cooling water feed rate/2nd cooling water feed rate ratio |
|---|---|---|---|---|---|---|---|---|
| 1 | 1 | 2,200 | 72 | 300 | 687 | 850 | 1,500 | 1/7 |
|   | 2 | 1,300 | 51 | 250 | 488 |   |   |   |
| 2 | 1 | 2,400 | 84 | 280 | 625 | 850 | 1,500 | 2/9 |
|   | 2 | 1,500 | 59 | 250 | 516 |   |   |   |
| 3 | 1 | 2,100 | 82 | 250 | 474 | 1,250 | 2,000 | 1/4 |
|   | 2 | 1,500 | 49 | 300 | 549 |   |   |   |
| 4 | 1 | 1,800 | 77 | 230 | 354 | 1,250 | 2,000 | 1/3 |
|   | 2 | 1,700 | 67 | 250 | 539 |   |   |   |
| 5 | 1 | 1,500 | 82 | 180 | 471 | — | 1,500 | — |
|   | 2 | 1,500 | 82 | 180 | 623 |   |   |   |

Note:
Position of cooling is expressed in terms of a distance from the inlet of the small-diameter front portion (135 $\phi$ × 850 l).

TABLE 2

|  | Ex. of the present invention | | | | Comp. Ex. | | | |
|---|---|---|---|---|---|---|---|---|
| Run No. | 1 | 2 | 3 | 4 | 5 | 6 | 7 | 8 |
| $N_2SA$ (m²/g) | 77 | 88 | 95 | 103 | 80 | 87 | 98 | 101 |
| compressive DBP absorption (ml/100 g) | 116 | 114 | 112 | 111 | 115 | 109 | 113 | 110 |
| true specific gravity (measured) | 1.7814 | 1.7541 | 1.7460 | 1.7392 | 1.7842 | 1.7723 | 1.7621 | 1.7643 |
| *1 true specific gravity (calculated) | 1.7848 | 1.7672 | 1.7560 | 1.7432 | 1.7800 | 1.7688 | 1.7512 | 1.7464 |
| void diameter of particle aggregate (nm) (measured) | 48 | 46 | 43 | 42 | 41 | 38 | 37 | 37 |
| *2 void diameter of particle aggregate (nm) (calculated) | 44.0 | 41.4 | 39.8 | 37.9 | 43.3 | 41.7 | 39.1 | 38.4 |
| Dst (nm) | 123 | 148 | 112 | 134 | 144 | 137 | 110 | 101 |

TABLE 2-continued

| | Ex. of the present invention | | | | Comp. Ex. | | | |
|---|---|---|---|---|---|---|---|---|
| Run No. | 1 | 2 | 3 | 4 | 5 | 6 | 7 | 8 |
| ΔDst (nm) (measured) | 115 | 128 | 125 | 132 | 110 | 98 | 108 | 78 |
| *3 ΔDst (nm) (calculated) | 106 | 121 | 99 | 113 | 19 | 114 | 98 | 92 |

Note:
*1: values obtained through calculation by making use of the equation 1.9080 − 0.0016 [N$_2$SA]
*2: values obtained through calculation by making use of the equation 62.2 − 0.263 [N$_2$SA]
*3: values obtained through calculation by making use of the equation 30.6 + 0.6118 [Dst]

EXAMPLE 2

Each carbon black sample shown in Table 2 was compounded with a synthetic rubber component comprising polybutadiene rubber (BR)/oil extended styrene-butadiene rubber (SBR) in a compounding ratio shown in Table 3.

Rubber compositions prepared by vulcanization treatment (vulcanization time: 40 min) of the compounds shown in Table 3 at a temperature of 145° C. were subjected to measurement of various rubber characteristics. The results are shown in Table 4 together with Run Nos. of the compounded carbon black samples shown in Table 2.

TABLE 3

| compounding components | pts. wt. |
|---|---|
| styrene-butadiene rubber (SBR) *1 | 96.25 |
| polybutadiene (BR) *2 | 30 |
| carbon black | 70 |
| aromatic oil (softening agent) | 10 |
| stearic acid (dispersion vulcanization assistant) | 2 |
| zinc oxide (vulcanization assistant) | 3 |
| phenyl-β-naphthylamine (antioxidant) | 0.9 |
| diphenyl-guanidine (vulcanization accelerator) | 0.5 |
| dibenzothiazyl disulfide (vulcanization accelerator) | 1.2 |
| sulfur (vulcanizing agent) | 1.65 |

Note:
*1: JSR 1712 [a product of Japan Synthetic Rubber Co., Ltd.]
*2: JSR BR01 [a product of Japan Synthetic Rubber Co., Ltd.]

TABLE 4

Rubber characteristics of BR/oil extended SBR compound

| | | Ex. of the present invention | | | | Comp. Ex. | | | |
|---|---|---|---|---|---|---|---|---|---|
| Run No. | | 1 | 2 | 3 | 4 | 5 | 6 | 7 | 8 |
| resilience (%) | | 46.2 | 45.9 | 44.3 | 43.8 | 44.1 | 42.0 | 40.8 | 39.1 |
| abrasion resistance | Lambourn (24% slip) | 102 | 105 | 106 | 108 | 101 | 102 | 103 | 110 |
| | Lambourn (60% slip) | 111 | 114 | 113 | 116 | 110 | 112 | 113 | 120 |
| | Pico abrasion resistance | 120 | 127 | 125 | 130 | 115 | 119 | 118 | 127 |
| hardness (JIS Hs) | | 60 | 62 | 62 | 63 | 61 | 61 | 62 | 64 |
| tensile stress at 300% (kg/cm$^2$) | | 124 | 128 | 115 | 120 | 119 | 113 | 121 | 125 |
| tensile strength (kg/cm$^2$) | | 223 | 229 | 218 | 220 | 215 | 210 | 217 | 228 |
| elongation (%) | | 540 | 530 | 545 | 535 | 550 | 530 | 555 | 520 |

Note to Table 4:
Methods of abrasion test:
1) Lambourn abrasion resistance was measured with a Lambourn abrasion tester (of mechanical slip type) under the following conditions.
Test piece: 10 mm in thickness, 44 mm in outside diameter
Emery wheel: GC type; grain size: 80; hardness: H
Carborundum added: grain size: 80; rate of addition: approximately 9 g/min
Speed of revolution of test piece: 660 rpm
Load of test piece: 4 kg
Relative slipping: 24%, 60%
2) Pico abrasion resistance was measured according to ASTM D-2228-76 "Standard Test Method for Rubber Property-Abrasion Resistance (Pico Abrader)" under the following conditions.
Load: 44 N
Frequency of rotation: 1 Hz
Speed of revolution: 160 rpm
The values of the abrasion tests are expressed in terms of index, with the reference being 100 which is the abrasion of a rubber composition prepared by compounding IRB No. 5 (standard carbon black) with the basic rubber under the same conditions.
Other characteristic properties than above were measured according to JIS K6301 "General Test Methods for Rubbers".

It is apparent from the results shown in Table 4 that when the carbon black used is Run Nos. 1 to 4 having all the requirements for the present invention, the rubber compositions exhibit not only abrasion resistance superior to that of the comparative rubber composition wherein the corresponding carbon black is Run Nos. 5 to 8 but also a significant improvement in the resilience.

What is claimed is;

1. A carbon black for a highly resilient, and abrasion resistant tire tread, the carbon black having an N$_2$SA of 75 to 105 m$^2$/g, a compressive DBP absorption of at least 110 ml/100 g and a true specific gravity $\leq 1.9080 - 0.0016 \times N_2SA$;

a void diameter of the particle aggregates $(nm) \geq 62.2 - 0.236 \times N_2SA$; and a range of aggregate size distribution $[\Delta Dst (nm)] \geq 30.6 + 0.6118 \times \overline{D}st$.

2. A carbon black for tire tread according to claim 1, wherein said carbon black is hard carbon black.

* * * * *